Jan. 9, 1951 G. E. MOODY Re. 23,324

FLOW CONTROL SYSTEM

Original Filed Aug. 15 1942 2 Sheets-Sheet 1

INVENTOR.
George E. Moody
BY
Joseph F. Westall
ATTORNEY.

FLOW CONTROL SYSTEM

Original Filed Aug. 15, 1942 2 Sheets-Sheet 2

INVENTOR.
George E. Moody
BY Joseph F. Westall
ATTORNEY.

Reissued Jan. 9, 1951

Re. 23,324

UNITED STATES PATENT OFFICE 23,324

FLOW CONTROL SYSTEM

George E. Moody, Glendale, Calif.

Original No. 2,478,702, dated August 9, 1949, Serial No. 454,917, August 15, 1942. Application for reissue August 7, 1950, Serial No. 178,159

13 Claims. (Cl. 161—7)

Matter enclosed in heavy brackets [ ] appears in the original patent but forms no part of this reissue specification; matter printed in italics indicates the additions made by reissue

This invention relates to flow control systems, and more specifically contemplates time-controlled valvular mechanisms for controlling the flow of water through each of a series of distributing units which is particularly adaptable for embodiment in sprinkling systems whereby different groups of sprinklers may be successively supplied with water under any desired pressure up to the maximum pressure of the main for predetermined periods of time.

Where large areas are to be supplied with water from a single main, it is common practice to provide a plurality of valves controlling different groups of sprinklers adapted to be operated successively so as to obtain maximum advantage from the pressure in the main while permitting the utilization of a minimum number of spray nozzles. The separate valves may be actuated to open and close mechanically in succession until the entire area has been serviced.

Most sprinkler installations are supplied with water from a pipe, leading from the main, by which other fixtures are serviced. In order to obviate any tendency of water discharged from the sprinkler system from being siphoned back into the pipes of the sprinkler system from which it might be subsequently drawn into the main or pipes leading to other fixtures, it is desirable, and in many municipalities it is required by law, that anti-siphon valves of some form be provided between each fixture and the valve controlling the flow to that fixture. Where the flow to different groups of sprinklers is controlled by individual valves it is costly to provide separate anti-siphon valves for each group of sprinklers. Moreover, as the anti-siphon valves must be located above the level of the ground in order to vent properly, the use of a plurality of such devices is unsightly.

It is a principal object of the present invention to provide a sprinkler system of the character above alluded to, embodying a series of individual valve-controlled sprinkler groups, the flow to which is controlled by a master valve effective to open before the first of the series of sprinkler-group valves opens, and close before the last of the sprinkler valves closes.

Another object is the provision of a system having a valve for controlling the flow to the entire system, which incorporates a single anti-siphon valve vented to the air and interposed in the flow line between the master valve and the individual valves by which flow to the sprinklers of the respective groups is controlled.

Another object is to provide a novel form of control unit for fluid-operated master and individual sprinkler valves adapted to be actuated manually or by a suitable electric motor, selectively.

Other objects and corresponding advantages, such for example as simplicity of construction, economy of manufacture, facility of installation and positive operation, will be apparent to those of skill in the art upon an examination of the following description read in the light of the accompanying drawings in which.

Figure 1:
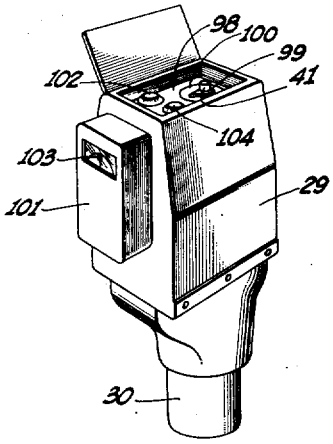
Fig. 1 is a perspective view of the casing in which the control unit is housed.
Figure 3:
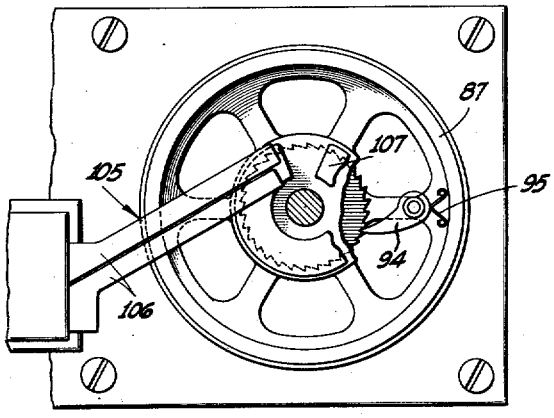
Fig. 3 is a view in plan of the apparatus contained in the control casing, illustrating particularly the switch by which the motor is actuated.
Figure 2:
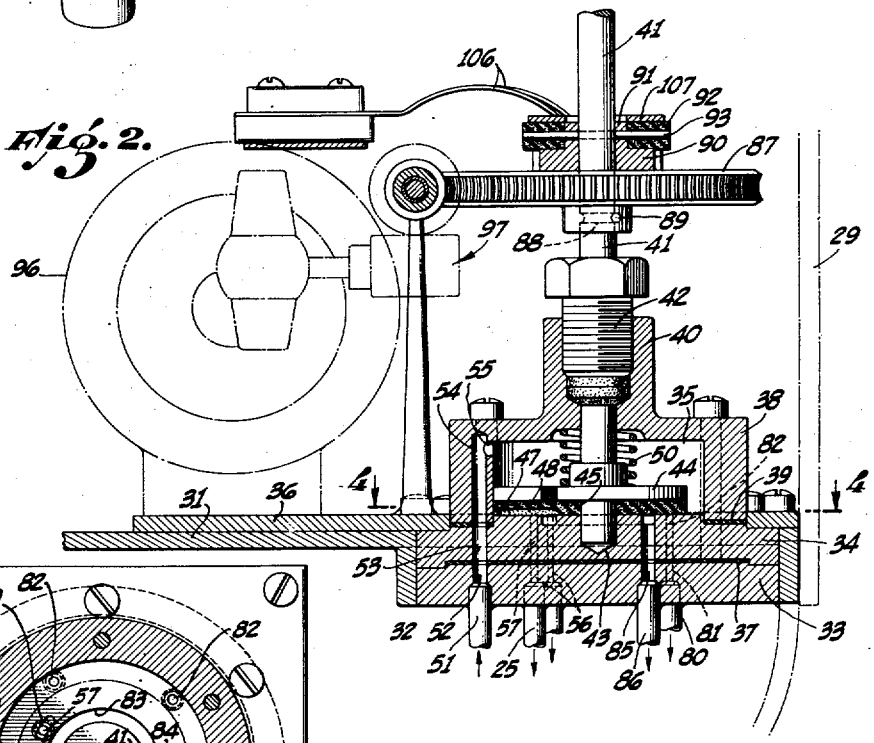
Fig. 2 is a sectional view of the control valve assembly illustrating in phantom the motor and reduction gearing by which it is actuated.
Figure 4:
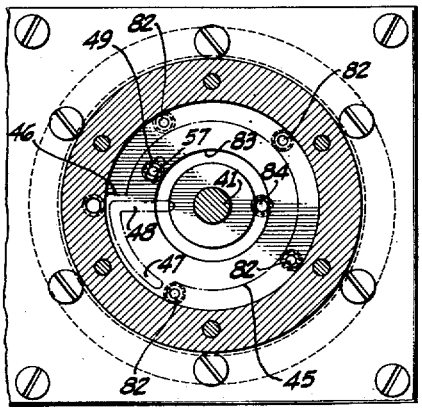
Fig. 4 is a sectional view taken on lines 4—4 of Fig. 2.
Figure 5:
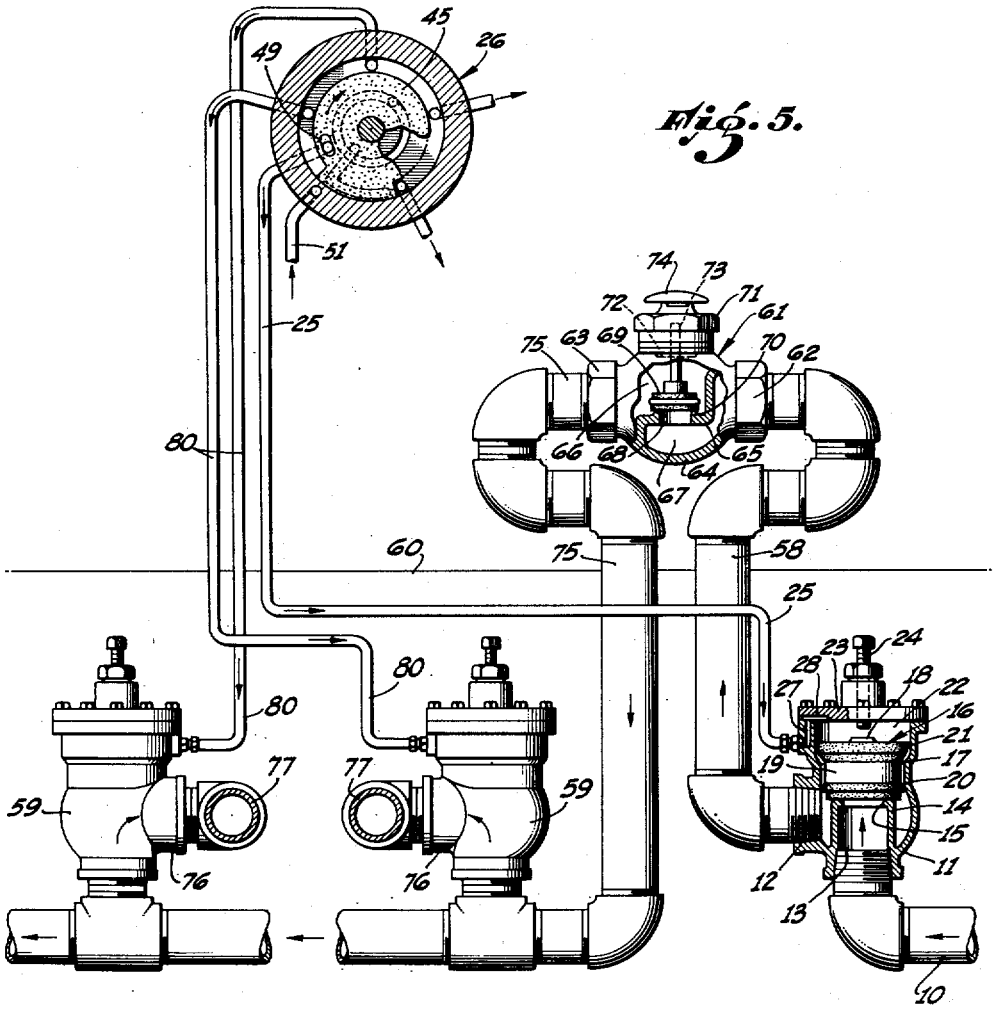
Fig. 5 is a view in section and elevation depicting the arrangement of various valve mechanisms and particularly the relative disposition of the anti-siphon valve with respect to the master valve and the individual valves controlling the flow to the different sprinkler divisions of the system.
Figure 6:
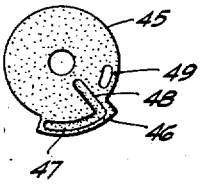
Fig. 6 is a plan view of the underside of the rotary valve member by which the pressure on the various sprinkler-group valves is controlled.

Referring to the drawings more in detail, the numerals of which indicate similar parts throughout the several views, 10 designates a pipe (Fig. 5) leading from a main (not shown) which supplies water to the system. Pipe 10 connects with the lower end of a master valve 11 comprising a cylindrical housing having a threaded side outlet 12. Water entering valve 11 from pipe 10 flows upwardly through a centrally located tubular member 13 integral with the valve housing, and from the upper end of the latter into an encircling chamber 14 from which outlet 12 leads. The upper open end of tubular member 13 forms a seat 15 for a valve member 16 disposed in the housing thereabove. Valve member 16 comprises an annular rubber body 17 disposed on a central core 18 and reinforced by an encircling band 19. Adjacent the lower end of rubber body 17 an annular flange 20 is formed which slideably engages the wall of the housing above outlet 12. The upper end of the valve housing is diametrically enlarged to accommodate the upper flange 21 of valve member 16 which is of greater cross-sectional area than the lower end of the rubber body. A pressure chamber 22 is formed above valve member 16 by a circular plate 23 enclosing the upper end of the housing. An adjusting screw 24 threaded through plate 23 provides a stop for determining the upward movement of valve 16. The valve member is normally closed by the pressure of water introduced into the pressure chamber 22 through a tube 25 leading from a control unit, generally indicated by the numeral 26, about to be described. Tube 25 is threaded into the upper wall of the housing and communicates with a vertical channel 27 formed in the wall. The channel intersects with a transverse channel 28 in the underside of top plate 23 opening into the pressure chamber 22.

The control mechanism (Figs. 1 to 4) is enclosed in a conveniently accessible casing 29 supported by a hollow standard 30. A subfloor 31 of casing 29 is formed with an opening into which a circular plate 33 is snugly fitted. Superimposed on plate 33 is a valve disk 34 forming the floor of a valve chamber 35 later referred to. The floor 36 of the casing overlying subfloor 31 overhangs the plate 33 and disk 34 and is bolted to the plate through the disk so as to clamp the last-named members together. A suitable gasket 37 is interposed between plate 33 and disk 34 to prevent leakage.

A circular head 38 is secured to disk 34 by screws or the like to compress an annular gasket 39 located between head 38 and disk 34 so as to effect a seal therebetween and form the fluid-tight valve chamber 35 within the head. Extending through a central boss 40 in the head is a valve stem 41 which is adapted to be rotated selectively by hand or by mechanical means, as will be described. The upper part of the bore of the boss 40 is enlarged to receive a packing gland 42 threaded therein to obviate leakage around stem 41. A bearing for the lower end of the valve stem 41 is formed by a central opening in disk 34, as indicated at 43. A plate 44 is mounted by suitable means to valve stem 41 within the valve chamber 35 so as to rotate with the stem and provide reinforcement for a valve member 45 composed of compressible material such as rubber, leather, fiber or the like, secured thereto. Valve member 45 is generally circular but is formed with a lateral projection 46 (Fig. 4) of approximately 70° in length. The undersurface of the projection is formed with an arcuate groove 47 adjacent and parallel to its outer edge, from one end of which groove 47 a radial groove 48 extends inwardly. An elongated port 49 is provided in valve member 45 in a circle concentric with stem 41 intersecting the radial groove 48 intermediate its ends. The port 49 is spaced circumferentially from the last-named groove 48 to the side of the latter opposite to which the arcuate groove 47 extends. The valve member 45 is resiliently retained in fluid-tight contact with the valve disk 34 by a helical spring 40 encircling valve stem 41 in valve chamber 35 between head 38 and plate 44.

Water under pressure in the main is admitted into the valve chamber 35 through a tube 51 which is connected to pipe 10, i. e., intermediate the main and the master valve 11.

The opposite end of tube 51 extends upwardly through the tubular mounting 30 of the control unit 26 and is secured by soldering or other suitable means in a port 52 through the plate 33 in alignment with the side wall of head 38. A hole 53 through valve disk 34 in registry with port 52 communicates tube 51 with a hole 54 extending upwardly through the side wall of head 38 to adjacent the top of the valve chamber 35. A lateral port 55 in the wall of the head intersecting with the hole 54 completes unrestricted communication between pipe 10 and the valve chamber 35.

Tube 25 leading from the upper pressure chamber 22 in master valve 11 extends through the mounting 30 and is similarly connected to plate 33 in an opening 56 which registers with a hole 57 through valve disk 34 in the circle of movement of the portion of the valve member 45 in which port 49 is located. It will thus be observed that when valve member 45 is turned to register the port 49 with the hole 57 in valve disk 34, water entering valve chamber 35 from tube 51 is permitted to flow into the upper pressure chamber 22 of the master valve 11 and to maintain the pressure of the main on the valve member 16 in the latter. Due to the differences in cross-sectional area between the upper and lower surfaces of valve 16, the pressure of the water thereabove will maintain said valve closed so as to prevent water from passing through the master valve 11 into a pipe 58 connected therewith leading to the various sprinkler group valves 59, hereinafter described.

The outlet pipe 58 leading from the side of master valve 11 extends above the level of the ground indicated by the numeral 60 where it is connected to an anti-siphon valve fitting 61 which is arranged with its interiorly threaded inlet 62 and outlet 63 in horizontal alignment. The central bulb 64 of the fitting is divided by a partition 65 into an upper chamber 66 communicated with the outlet 63, and the lower chamber 67 connected to the inlet 62 of the fitting. An intermediate portion of partition 65 is ported as at 68 to communicate chambers 66 and 67 on opposite sides thereof. A poppet-type gravity-operated valve 69 located in the upper chamber 66 is adapted to seat on a circular bead 70 surrounding the port 68. The upper chamber is vented through a hollow plug 71 threaded into an opening in the upper wall of the fitting in alignment with the port 68. The lower end of the plug forms a circular valve seat 72 which, with the plug threaded into the fitting, is disposed concentric with bead 70. Integral with the bore of the plug a guide (not shown) is formed, through which the stem 73 of the valve 69 slidably extends so as to retain the valve in operative relationship with its respective seats 70 and 72. 74 indicates a dome, supported above the upper open end of plug 71 to prevent debris from entering the vent and fouling the valve.

A pipe 75 connected to the outlet 63 of the anti-siphon fitting 61 leads to each of a series of valves 59 controlling the flow into separate groups of sprinklers (not shown) to which water is to be supplied, successively. The valves 59 are identical in construction with the master valve 11, the pipe 75 being connected to the inlet in the lower end of each of said valves. From the side outlet 76 of the respective valves 59, a pipe 77 leads to the particular sprinkler heads controlled by that valve. The valve members 16 of the respective valves 59 are normally held in their lower closed position by the pressure of water admitted into the upper pressure chamber 22 through a series of tubes 80 from the control unit. Tubes 80 extend from their respective valves upwardly through the tubular mounting 30 into casing 29 where they are connected in ports 81 in the underside of the plate, registering and communicating with holes 82 in valve disk 34 which open into the valve chamber 35 in the circle of movement of the arcuate groove 47 in the lateral projection 46 of the valve member 45. The holes 82 in valve disk 34 are spaced apart a greater distance than the circumferential length of the projection 46 of the valve member, the arcuate groove 47 of which is brought into registry with said holes 82 successively in the operation of the device. When the mechanism is not in operation, the projection 46 of valve member 45 is disposed between a pair of the holes 82 so that each hole is in open communication with the valve chamber 35. With the rotary valve member 45 so positioned, the water pressure in the valve chamber 35 will be communicated through the various holes 82 to the upper chamber 22 of the respective valves 59 to maintain said valves closed.

The inner end of the radial groove 48 in the rotary valve member 45 terminates above a circular channel 83 formed in valve disk 34, having a radius of a length less than the distance between the axis of the stem 41 and the elongated port 49 in the valve member 45. The channel 83 is communicated through registering ports 84 and 85 in the valve disk 34 and plate 33, respectively, with a drain tube 86 secured in port 85 at the underside of the plate. Drain tube 86 leads through the tubular mounting 30 to the outside of the apparatus to drain the water from the upper chambers 22 of the respective valves so as to relieve pressure on the valve members 16 therein, as will appear.

The valve member 45 is adapted to be rotated at a predetermined constant speed through a gear 87 rotatably mounted on valve stem 41. To this end the stem is formed with an annular groove 88 above the packing gland 42. A pin 89 extending through the hub of the gear 87 is intercepted by groove 88 to support the gear on stem 41 without interfering with independent rotative movement of the valve stem. A ratchet wheel 90 encircles the stem 41 above gear 87. An upstanding hub 91 of wheel 90 provides a mounting for a ring 92 composed of nonconducting material. The wheel 90, ring 92 and stem 41 are connected non-rotatably by a pin 93 which extends through these parts. A pawl 94 is pivoted to the top of gear 87 and is urged into engagement with the teeth of the ratchet wheel 90 by a wire spring 95 so that clockwise movement of gear 87 will be transmitted to ratchet wheel 90 and the stem 41, but permitting manual clockwise movement of the stem independent of the gear 87 for purposes later described. The gear 87 is turned by a motor 96 connected with the former through suitable reduction gearing generally indicated at 97.

Valve stem 41 extends upwardly through a transverse panel 98 in the upper part of casing 29 and has secured thereto an indicator 99 which overlies a dial 100 carried by panel 98, to indicate the position of valve 45 and associated mechanism at any stage of its operation and to assist manual adjustment, as will appear. The energization of motor 96 is controlled by a time switch mechanism of conventional construction which includes a clock (not shown) enclosed within a housing 101 mounted on the side of casing 29. An auxiliary switch (not shown) in the same circuit through the motor is controlled by a knob 102 by the panel. With the switch controlled by knob 102 closed, the clock mechanism may be adjusted to complete the circuit and initiate the energization of motor 96 at any time of the day or night and for any desired period. A dial and needle 103, shown in an opening in housing 101, are provided to facilitate this adjustment. A rheostat (not shown) in the circuit is manually adjusted by a knob 104 to vary the speed of the motor. After the motor 96 is started as above described, an auxiliary circuit, independent of the timer switch but primarily controlled by the knob-operated switch, is closed by a switch 105 comprising a pair of parallel spring finger contacts 106, each secured at one end to a suitable mounting below panel 98, with the opposite adjacent ends of the spring fingers 106 riding on an arcuate electric contact 107 secured to the upper surface of ring 92. With the apparatus at rest the fingers 106 bear upon the ring 92 between the ends of the contact 107 so as to maintain the circuit controlled thereby open. Slight rotative movement of ring 92 initiated by the closing of the clock controlled switch is effective to shift the contact into engagement with the ends of both fingers 106 so as to close the auxiliary circuit to motor 96. Energization of motor 96 for a complete cycle of operation will thus be assured by the closing of switch 105. If the operator desires the apparatus to operate through one complete cycle and then stop, the time mechanism will be preadjusted to maintain the circuit controlled thereby closed for a period sufficient for the contact 107 to move into engagement with fingers 106 so as to close the auxiliary circuit, but less than the time required for the valve member 45 to complete one revolution. Thus the time switch will open its circuit before completion of the cycle of operation, and motor 96 will continue to operate in response to the electric current supplied through the auxiliary circuit controlled by switch 105. When the cycle is complete, spring fingers 106 will ride off the contact onto ring 92 between the ends of contact 107, opening the circuit and stopping the motor. It will be apparent that if the operator wishes the apparatus to continue to operate for two or more complete cycles, the time switch should be adjusted to maintain the circuit controlled thereby closed until sufficient time has elapsed for the completion of all of the successive cycles of operation except the last one, and to break the circuit during the last operation, upon the completion of which switch 105 will open as above described, stopping the motor.

When installed as hereinabove described, the operation of the system is as follows: The switch controlled by knob 102 is first closed, which will enable energization of motor 96 upon the subsequent closing of the timer switch. The time at which the system is to be started and number of cycles of operation are then determined by adjustment of the timer 101. The period during which water is to be supplied to each set of sprinklers during each cycle of operation may also be predetermined by adjustment of the rheostat by manipulation of knob 104. The circuit to motor 96 will be subsequently closed in accordance with the adjustment of the timer initiating clockwise rotation of the gear 87 through the reduction gearing 97. The pawl 94 transmits this movement to ring 92 and arcuate contact 107 which is moved into engagement with the fingers 106, as above described, to close the auxiliary circuit to the motor 96. The valve stem 41 is slowly turned, incident to this operation, so as to turn the valve member 45 from the position illustrated in Fig. 4 to misalign the elongated port 49 in the valve member 45 with the hole 57 in the valve disk 34. Continued movement will shift the radial groove 48 in valve 45 over the port. Pressure of the water in pipe 10 exerted against the underside of valve member 16 therein will force the valve upwardly and expel the water thereabove through the tube 25, opening 56 in the plate 33 and hole 57, through the radial groove 48 into the circular channel 83 from which it will flow through the drain tube 86 to a point outside of control unit 26. With the master valve 11 opened, water flows through pipe 58 into the anti-siphon valve 61. The valve member 69 in the latter will be forced upwardly against seat 72 to close off the vent, and the water will flow to each of the various valves 59 controlling the separate groups of sprinklers. The valve member 45 prevents water under pressure in the chamber 35 from being exerted on the master valve 11 by maintaining the hole 57 closed. When the lateral extension 46 of the valve member 45 moves over the first of the series of holes 82, communication between the valve 59 with which said first hole 82 in disk 34 is connected and the valve chamber 35 will be cut off. As the arcuate groove 47 is moved into registry with the first port 82, the water in the upper chamber 22 of that valve 59 will be expelled through the grooves 47 and 48 and channel 83 and thence through the drain tube 86 in response to the pressure of water in pipe 75 against the underside of the valve member 16 as the latter is displaced from its seat, permitting water to flow to each of the sprinklers controlled by the valve thus opened. The valve 59 last named will remain opened until the arcuate groove 47 is again misaligned with the holes 82 leading to the valve. When this occurs the communication between the first hole 82 and the drain 86 will be shut off by the end of the lateral projection 46, which then slowly moves from said hole 82 and permits communication between the valve chamber 35 of the control unit 26 and the upper pressure chamber 22 of the particular valve 59 being actuated. Water from the chamber 35 will accordingly again flow through tube 80 into valve 59 to exert sufficient pressure on the valve member 16 therein to close the latter. Immediately thereafter the rotary valve 45 will be shifted sufficiently to register the arcuate groove 47 with the second hole 82 in the valve disk 34 to open the second of the series of sprinkler-group valves 59. Valves are thus opened and closed successively.

The hold 57 controlling entrance into tube 25 leading to master valve 11, and hole 82 communicated with the last valve 59 of the series of individual sprinkler group valves, are spaced circumferentially so as to insure the alignment of the elongated port 49 in the valve member 45 just prior to the closing off of the last valve 59 actuated. The valve member 45 will continue to rotate, however, until the lateral projection 46 of said valve member has uncovered the last hole 82 so as to enable water to pass from the control valve chamber 35 into the upper chamber 22 of the last valve 59 to complete the cycle of operation, whereupon the contact 107 will have been moved out of engagement with the fingers breaking the circuit and stopping the motor.

Water may be supplied to any one of the various sprinkler-groups individually without a complete cycle of operation of the mechanism by manual adjustment of rotary valve 45. A handle (not shown) formed to fit the upper end of the valve stem 41 is provided by which the rotary valve may be turned so as to register the arcuate groove 47 in the valve member 45 with the hole 82 in valve disk 34 which is communicated with the pressure chamber 22 of the valve 59 controlling the sprinklers in the area to be watered. Unless the motor 96 is energized, water will flow to the selected group of sprinklers continuously until rotary valve 45 is again turned to open communication between the valve chamber 35 and the pressure chamber 22 of the open sprinkler group valve 59.

It will thus be seen that I have provided a sprinkler control system embodying a plurality of valves controlling separate groups of sprinklers adapted to be controlled manually or successively opened and closed automatically to supply water under full pressure of the main to each of the sprinkler groups, flow through the entire system being controlled by a master valve operable to open before any of the sprinkler valves open and to close off before the flow through the last sprinkler-group valve is closed, and, further, incorporating an anti-siphon valve interposed in the flow system between the master valve and individual sprinkler group valves.

While I have shown but one embodiment of my invention, it will be obvious that numerous changes in size, design, shape and proportion of the various parts may be made; that any conventional timing apparatus may be substituted for that shown and described; that the type of valves incorporated in the embodiment shown is only illustrative and not essential to the system as a unit; and that the apparatus for actuating the control unit mechanism may be varied in numerous particulars — all without departing from the spirit of the appended claims.

What I claim and desire to secure by Letters Patent is:

1. In a flow control system, a plurality of distributing valves, a water supply pipe leading to each of said distributing valves, a master valve interposed in said pipe to control the supply of water to each of said distributing valves, a control unit to open said master valve for a predetermined period of time, said control unit comprising a circular head, a valve chamber within said head, said valve chamber having a floor, said floor being provided with a plurality of ports, a valve member provided with a port and an arcuate groove and radial groove, said port and said groove being adapted to register selectively with corresponding ports in said valve chamber floor, a plate, a valve stem attached to said plate, and means adapted to resiliently hold said plate and said valve member in rotatable contact with said floor for selective rotatable registry with ports therein to open and close each of said distributing valves successively, and to close said master valve before the closing of the last of said distributing valves.

2. In a flow control system, a plurality of distributing valves, a water supply pipe leading to each of said distributing valves, a master valve interposed in said conduit to control the supply of water to each of said distributing valves, a control unit to open said master valve for a predetermined period of time, said control unit comprising a hollow circular head, a valve chamber enclosed within said head, the floor of said valve chamber comprising a valve disk, said valve disk being provided with a series of conduits therethrough, a valve member provided with a port and adjoining arcuate and radial grooves in its lower surface, a valve stem, a plate mounted on said valve stem within said valve chamber so as to rotate with said stem and superposed on said valve member, and means to resiliently hold said valve member and its superposed plate in rotatable contact with said valve disk to open and close each of said distributing valves successively and to close said master valve before the closing of the last of said distributing valves, and means to vary the period elapsing between the opening and closing of each of said distributing valves.

3. In a flow system, a plurality of fluid-actuated distributing valves and a fluid-actuated master valve, a conduit connecting said master valve with each of said distributing valves, each of said valves having a pressure chamber therein, an anti-siphon valve interposed in said conduit, a control unit comprising a casing forming a pressure chamber, means to supply fluid pressure to said last-named pressure chamber, and a rotary valve member within said last-named chamber, conduits connecting the pressure chamber of each of said distributing valves with the pressure chamber of said control unit, and a conduit including a port in said rotary valve member connecting the pressure chamber of said control unit and the pressure chamber of said master valve, said rotary valve including means to close communication between the pressure chambers of said control unit and said master valve and thereafter to successively close and open communication between each of the pressure chambers of said distributing valves and the pressure chamber of said control unit, and to open communication between the pressure chamber of said master valve and the pressure chamber of said control unit during the opening of one of the conduits between one of the distributing valves and the pressure chamber of said control unit, and means to vent the pressure chambers of said master and each of said distributing valves when communication thereof, respectively, with the pressure chamber of said control unit is closed.

4. In a flow system, a plurality of fluid-actuated distributing valves and a fluid-actuated master valve, a conduit connecting said master valve with each of said distributing valves, each of said valves having a pressure chamber therein, an anti-siphon valve interposed in said conduit, a control unit comprising a casing forming a pressure chamber, means to supply fluid pressure to said last-named pressure chamber, and a rotary valve member within said last-named chamber, conduits connecting the pressure chamber of each of said distributing valves with the pressure chamber of said control unit, and a conduit including a port in said rotary valve member connecting the pressure chamber of said control unit and the pressure chamber of said master valve, said rotary valve including means to close communication between the pressure chambers of said control unit and said master valve and thereafter to successively close and open communication between each of the pressure chambers of said distributing valves and the pressure chamber of said control unit, and to open communication between the pressure chamber of said master valve and the pressure chamber of said control unit during the closure of one of the conduits between one of the distributing valves and the pressure chamber of said control unit, and means to vent each of the pressure chambers of said master valve and said distributing valves during closure of communication between the master valve and said distributing valves, respectively, and the pressure chamber of the control unit, said rotary valve being operable to control said last-named means.

5. In a flow system, a plurality of fluid-actuated distributing valves and fluid-actuated master valve, a conduit connecting said master valve with each of said distributing valves, each of said valves having a pressure chamber therein, an anti-siphon valve interposed in said conduit, a control unit comprising a casing forming a pressure chamber, means to supply fluid pressure to said last-named chamber, and a rotary valve member within said last-named chamber, conduits connecting the pressure chamber of each of said distributing valves with the pressure chamber of said control unit, and a conduit including a port in said rotary valve member connecting the pressure chamber of said control unit and the pressure chamber of said master valve, said rotary valve being operable to successively close communication between the pressure chamber of said master valve and the pressure chamber of the control unit and to close and open communication between the pressure chamber of each of said distributing valves and the pressure chamber of said control unit, and to open communication between the pressure chamber of said master valve and the pressure chamber of said control unit during the opening of one of the conduits between one of the distributing valves and the pressure chamber of said control unit, the conduits connecting said distributing valves with the pressure chamber of said control unit being circuitously arranged, said rotary valve having a radial groove and an arcuate groove therein on the radius of the circle in which said last-named conduits are disposed, and a vent connected with said radial groove whereby said rotary valve is operable to vent each of the pressure chambers of said master valve and of said distributing valves substantially coincidentally with the closure of the conduits between said pressure chamber of said control unit and said master valve and said distributing valves, respectively.

6. In a flow system, a plurality of fluid-actuated distributing valves and a fluid-actuated master-valve, a conduit connecting said master valve with each of said distributing valves, each of said valves having a pressure chamber therein, an anti-siphon valve interposed in said conduit, a control unit comprising a casing forming a pressure chamber, means to supply fluid pressure to said last-named chamber, and a rotary valve member within said last-named chamber, conduits connecting the pressure chamber of each of said distributing valves with the pressure chamber of said control unit, and a conduit including a port in said rotary valve member connecting the pressure chamber of said control unit and the pressure chamber of said master valve, said rotary valve being operable to successively close communication between the pressure chamber of said master valve and the pressure chamber of the control unit and to close and open communication between each of the pressure chambers of said distributing valves and the pressure chamber of said control unit, and to open communication between the pressure chamber of said master valve and the pressure chamber of said control unit during the opening of one of the conduits between one of the distributing valves and the pressure chamber of said control unit, the conduits connecting said distributing valves with the pressure chamber of said control unit being circuitously arranged, said rotary valve having a radial groove and an arcuate groove therein on the radius of the circle in which said last-named conduits are disposed, and a vent connected with said radial groove whereby said rotary valve is operable to vent each of the pressure chambers of said master valve and of said distributing valves substantially coincidentally with the closure of the conduits between said pressure chamber of said control unit and said master valve and said distributing valves, respectively, means to rotate said rotary valve at a predetermined speed, and means to render said last-named means inoperable at the end of substantially one revolution of said rotary valve.

7. In a flow control system, a water supply pipe, a fluid-actuated master valve controlling flow through said pipe, a fluid-actuated distributing valve, a conduit leading from said master valve to said distributing valve to conduct fluid from said pipe to said distributing valve, an anti-siphon valve interposed in said conduit, a rotary valve, means to supply actuating fluid under pressure to said rotary valve, tubular means connecting said rotary valve with said master and distributing valves, respectively, for conducting actuating fluid under presure to each of the latter valves to normally maintain said master and distributing valves closed, said rotary valve being operable in response to rotation to relieve pressure, transmitted through said tubular means, in said master valve and said distributing valve successively to permit said fluid-actuated valves to open in corresponding sequence, and upon further rotation to transmit actuating fluid under pressure in said rotary valve to said master valve and, thereafter, to said distributing valve through said tubular means to close said master valve and thereafter close said distributing valve to the flow of fluid from said water supply pipe.

8. In a flow control system for a plurality of sprinklers, a water supply pipe, a master valve connected to said pipe, a plurality of distributing valves, a distributing pipe connecting said master valve with each of said distributing valves, an anti-siphon valve in said last-named pipe, flow through said distributing pipe being controlled by said master valve, said master and each of said distributing valves comprising a pressure chamber and a valve member reciprocable in said pressure chamber, said valve member being movable to closed position in response to pressure introduced into said pressure chamber, a control unit comprising a valve mechanism, a conduit leading from said supply pipe to said control unit, means to vent the pressure chamber of each of said master and distributing valves and means of communication between said control unit and said master and each of said distributing valves for the flow of pressure fluid from said conduit, said venting means and said means of communication being controlled by said valve mechanism, said valve mechanism being normally open to admit pressure fluid from said conduit to the pressure chambers of said master and of said distributing valves, and operable to sequentially close said means of communication between the pressure chamber of said master valve and said conduit, open said last-named pressure chamber to said venting means, close and again open the pressure chambers of all but one of said distributing valves to said conduit and open each of said last-named pressure chambers to said venting means while said chambers, respectively, are closed to the pressure of said conduit, and thereafter close the pressure chamber of said master valve to said venting means and open the same to said conduit.

9. In a flow control system, for a plurality of sprinklers, a water supply pipe, a master valve connected to said pipe, a plurality of distributing valves, a distributing pipe connecting said master valve with each of said distributing valves, an anti-siphon valve in said last-named pipe, flow through said distributing pipe being controlled by said master valve, said master and each of said distributing valves comprising a pressure chamber and a valve member reciprocable in said pressure chamber, said valve member being movable to closed position in response to pressure introduced into said pressure chamber, a control unit comprising a rotary valve mechanism, a conduit leading from said supply pipe to said control unit, means to vent the pressure chamber of each of said master and distributing valves and means of communication between said control unit and said master and each of said distributing valves for the flow of pressure fluid from said conduit, said venting means and said means of communication being controlled by said rotary valve mechanism, said valve mechanism being normally open to admit pressure fluid from said conduit to the pressure chambers of said master and of said distributing valves, and operable upon rotation to sequentially close said means of communication between the pressure chamber of said master valve and said conduit, open said last-named pressure chamber to said venting means, close and again open the pressure chambers of all but one of said distributing valves to said conduit and open each of said last-named pressure chambers to said venting means while said chambers, respectively, are closed to the pressure of said conduit, and thereafter close the pressure chamber of said master valve to said venting means and open the same to said conduit.

10. In a flow control system, a water supply pipe, a fluid actuated master valve controlling flow through said pipe, a pair of fluid-actuated distributing valves, a conduit leading from said master valve to said distributing valves, an anti-siphon valve in said conduit, a control mechanism comprising a casing having a partition, said partition having an opening in which a circular plate is snugly fitted, a rotary valve disk superposed on said last-mentioned plate, and a valve chamber above said valve disk, means to supply fluid pressure to said valve chamber, conduits connected to each of said master and distributing valves extending through said partition and controlled by said rotary valve, said rotary valve being operable to sequentially close said master valve to pressure of said valve chamber of said control mechanism, close and open one of said distributing valves to the pressure of said valve chamber, close the second of said distributing valves to said pressure, open said master valve to said pressure and thereafter open said second distributing valve to the pressure of said valve chambers, and means to vent said master valve and each of said distributing valves during the respective open phases of said rotary valve.

*11. In a flow control system: a water supply pipe; a fluid-actuated master valve controlling flow through said pipe; a fluid-actuated distributing valve; a conduit leading from said master valve to said distributing valve to conduct fluid*

*from said pipe to said distributing valve; an anti-siphon valve interposed in said conduit; a rotary valve; means to supply actuating fluid under pressure to said rotary valve; tubular means connecting said rotary valve with said master and distributing valves, respectively, for conducting actuating fluid under pressure to each of the latter valves to actuate said master and distributing valves, said rotary valve being operable in response to rotation to effect changes in fluid pressure, transmitted through said tubular means, in said master valve and said distributing valve successively to open said fluid-actuated valves in corresponding sequence; and said rotary valve being operable upon further rotation to transmit through said tubular means fluid pressure changes to said master valve and, thereafter, to said distributing valve first to close said master valve and thereafter close said distributing valve to the flow of fluid from said water supply pipe.*

*12. In a flow control system: a water supply pipe; a fluid-actuated master valve controlling flow through said pipe; a fluid-actuated distributing valve; a conduit leading from said master valve to said distributing valve to conduct fluid from said pipe to said distributing valve; an anti-siphon valve interposed in said conduit; control valve means; means to supply actuating fluid under pressure to said control valve means; tubular means connecting said control valve means with said master and distributing valves, respectively, for conducting actuating fluid under pressure to each of the latter valves to actuate said master and distributing valves, said control valve means being operable to effect changes in fluid pressure, transmitted through said tubular means, in said master valve and said distributing valve successively to open said fluid-actuated valves in corresponding sequence; and said control valve means being operable thereafter to transmit through said tubular means fluid pressure changes to said master valve and, thereafter, to said distributing valve first to close said master valve and thereafter to close said distributing valve to the flow of fluid from said water supply pipe.*

*13. In a flow control system for a plurality of sprinklers, a water supply pipe; a fluid-actuated master valve controlling flow through said pipe; a plurality of fluid-actuated distributing valves each controlling flow to a group of sprinklers; a conduit leading from said master valve to each of said distributing valves to conduct fluid from said pipe to said distributing valves; an anti-siphon valve interposed in said conduit between said distributing valves and the master valves; control valve means; means to supply actuating fluid under pressure to said control valve means; tubular means connecting said control valve means with each of said master and distributing valves, respectively, for conducting actuating fluid under pressure to each of the latter valves to actuate said master and distributing valves, said control valve means being operable to effect changes in fluid pressure, transmitted through said tubular means, in said master valve and said distributing valves successively to open said fluid-actuated valves in corresponding sequence; and said control valve means being operable thereafter to transmit through said tubular means fluid pressure changes to all distributing valves but one and then to said master valve and, thereafter, to said one distributing valve to close said master valve after closing all but one distributing valve and thereafter to close said one distributing valve, to the flow of fluid from said water supply pipe.*

GEORGE E. MOODY.

REFERENCES CITED

The following references are of record in the file of this patent:

UNITED STATES PATENTS

| Number | Name | Date |
|---|---|---|
| 1,606,245 | Lang | Nov. 9, 1926 |
| 1,652,845 | Vennum | Dec. 13, 1927 |
| 1,753,240 | Howell et al. | Apr. 8, 1930 |
| 1,868,801 | Munz | July 26, 1932 |
| 2,026,271 | Cooper | Dec. 31, 1935 |
| 2,185,394 | Arbogast | Jan. 2, 1940 |
| 2,243,815 | Griswold | May 27, 1941 |
| 2,244,782 | Jones | June 10, 1941 |
| 2,252,125 | Hauser | Aug. 12, 1941 |
| 2,284,158 | Lewis | May 26, 1942 |
| 2,294,092 | Moody | Aug. 25, 1942 |
| 2,367,319 | Wahlberg | Jan. 16, 1945 |